US009616734B2

(12) United States Patent
Clark et al.

(10) Patent No.: US 9,616,734 B2
(45) Date of Patent: Apr. 11, 2017

(54) CO-EXTRUDED U-CHANNEL WITH INTEGRATED GLASSRUN

(75) Inventors: Patrick R. Clark, Clayton, NC (US); Steve Stoll, Rochester Hills, MI (US); Rod Bara, Rochester Hills, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

(21) Appl. No.: 13/384,349

(22) PCT Filed: Jul. 19, 2010

(86) PCT No.: PCT/US2010/042414
§ 371 (c)(1),
(2), (4) Date: Mar. 29, 2012

(87) PCT Pub. No.: WO2011/009116
PCT Pub. Date: Jan. 20, 2011

(65) Prior Publication Data
US 2012/0174491 A1    Jul. 12, 2012

Related U.S. Application Data

(60) Provisional application No. 61/226,548, filed on Jul. 17, 2009.

(51) Int. Cl.
*E06B 7/16*    (2006.01)
*B60J 5/04*    (2006.01)
(Continued)

(52) U.S. Cl.
CPC ............ *B60J 5/0402* (2013.01); *B60J 10/30* (2016.02); *B60J 10/32* (2016.02); *B60J 10/74* (2016.02)

(58) Field of Classification Search
CPC .... B60J 10/04; B60J 10/0017; B60J 10/0074; B60J 10/0071; B60J 10/0062
(Continued)

(56) References Cited

U.S. PATENT DOCUMENTS 3,290,826 A * 12/1966 Weimar .......................... 49/440
3,333,364 A *  8/1967 Herr ..................... B60J 10/0008
126/343.5 R
(Continued)

FOREIGN PATENT DOCUMENTS

DE          31 40 140 A1    4/1983

OTHER PUBLICATIONS

International Search Report and Written Opinion for PCT/US2010/042414.
(Continued)

*Primary Examiner* — Justin Rephann
(74) *Attorney, Agent, or Firm* — Fay Sharpe LLP

(57) ABSTRACT

A glassrun or weatherseal assembly includes a generally rigid channel having first and second legs joined by an interconnecting leg. First and second seal portions extend into a portion of the channel cavity and are adapted to seal against an associated vehicle window. A door frame assembly includes a first or inner door panel and second or outer door panel having end portions spaced apart by a dimension adapted to receive the channel. The channel can be secured to the door frame assembly in a variety of different manners including an adhesive/chemical bond, snap-fit fastener, rivet, clip, adhesive tape, or combinations of one or more of these securing mechanisms.

6 Claims, 17 Drawing Sheets

(51) Int. Cl.
*B60J 10/30* (2016.01)
*B60J 10/32* (2016.01)
*B60J 10/74* (2016.01)

(58) Field of Classification Search
USPC .......... 49/475.1, 484.1, 489.1, 490.1, 492.1,
49/493.1, 495.1, 440, 441; 296/146.9
See application file for complete search history.

(56) References Cited

U.S. PATENT DOCUMENTS

| | | | | |
|---|---|---|---|---|
| 3,401,075 | A * | 9/1968 | Jackson | 428/90 |
| 3,918,206 | A | 11/1975 | Dochnahl | |
| 3,958,369 | A * | 5/1976 | Mathellier | B60J 10/0017 49/479.1 |
| 4,001,974 | A * | 1/1977 | Wright | 49/489.1 |
| 4,010,573 | A * | 3/1977 | Andrzejewski | 49/479.1 |
| 4,047,751 | A * | 9/1977 | Koike | B60J 10/0042 296/146.9 |
| 4,370,833 | A * | 2/1983 | Niemanns | 49/489.1 |
| 4,470,223 | A * | 9/1984 | Mesnel | B60J 10/0008 49/441 |
| 4,553,354 | A * | 11/1985 | Barbero | 49/431 |
| 4,667,442 | A * | 5/1987 | Hiramatsu | B60J 5/0402 49/374 |
| 4,809,463 | A * | 3/1989 | Schroder | B60J 1/17 49/377 |
| 4,888,917 | A * | 12/1989 | Mesnel et al. | 49/479.1 |
| 4,910,918 | A * | 3/1990 | Naples et al. | 49/441 |
| 4,969,293 | A * | 11/1990 | Guillon | B60J 10/0005 49/374 |
| 5,010,689 | A * | 4/1991 | Vaughan | B60J 10/0022 49/440 |
| 5,032,444 | A * | 7/1991 | Desir, Sr. | 428/122 |
| 5,226,258 | A * | 7/1993 | Mesnel | B60J 10/0051 49/440 |
| 5,356,194 | A * | 10/1994 | Takeuchi | 296/146.9 |
| 5,365,698 | A * | 11/1994 | Nozaki | B60J 10/04 49/441 |
| 5,398,451 | A | 3/1995 | Mesnel | |
| 5,423,147 | A * | 6/1995 | Dupuy | 49/490.1 |
| 5,463,832 | A * | 11/1995 | Eckart | 49/479.1 |
| 5,466,508 | A * | 11/1995 | Brocke et al. | 428/122 |
| 5,527,583 | A | 6/1996 | Nozaki et al. | |
| 5,702,148 | A | 12/1997 | Vaughan et al. | |
| 5,791,722 | A * | 8/1998 | Nozaki et al. | 296/146.9 |
| 6,030,022 | A * | 2/2000 | Bormann | B60J 10/0005 296/107.01 |
| 6,185,869 | B1 * | 2/2001 | Kawai | B60J 10/0017 49/441 |
| 6,213,536 | B1 * | 4/2001 | Raisch | B60J 10/0011 296/107.04 |
| 6,237,287 | B1 * | 5/2001 | Nakagawa et al. | 49/479.1 |
| 6,257,644 | B1 * | 7/2001 | Young | 296/93 |
| 6,260,906 | B1 * | 7/2001 | Buchholz | B60J 10/10 296/107.04 |
| 6,301,834 | B1 * | 10/2001 | Tyves | B60J 10/0005 49/441 |
| 6,409,251 | B1 * | 6/2002 | Kaye et al. | 296/146.9 |
| 6,451,411 | B1 * | 9/2002 | Riley | 428/156 |
| 6,485,663 | B1 * | 11/2002 | Dover | B60J 10/0005 264/173.17 |
| 6,557,304 | B2 * | 5/2003 | Ellis | 49/441 |
| 6,941,719 | B2 * | 9/2005 | Busseuil | B62D 25/00 296/187.02 |
| 6,996,936 | B1 * | 2/2006 | Maass | 49/479.1 |
| 7,052,072 | B2 * | 5/2006 | Patberg | 296/146.9 |
| 7,294,386 | B2 | 11/2007 | Murase et al. | |
| 7,316,097 | B2 | 1/2008 | Shiraiwa et al. | |
| 7,698,856 | B2 * | 4/2010 | Tamaoki | B60J 10/0005 49/441 |
| 7,735,263 | B2 * | 6/2010 | Oba et al. | 49/490.1 |
| 7,762,614 | B2 * | 7/2010 | Kubo et al. | 296/146.2 |
| 8,769,876 | B2 * | 7/2014 | Albanese et al. | 49/489.1 |
| 2001/0017005 | A1 | 8/2001 | Ellis | |
| 2001/0034977 | A1 * | 11/2001 | Hattori | 49/479.1 |
| 2004/0157013 | A1 * | 8/2004 | Nakajima et al. | 428/34.1 |
| 2005/0095397 | A1 * | 5/2005 | Omori | B32B 27/08 428/122 |
| 2005/0206201 | A1 * | 9/2005 | Iimori | B60J 7/043 296/216.09 |
| 2006/0005469 | A1 | 1/2006 | Bara et al. | |
| 2006/0103047 | A1 * | 5/2006 | Zwolinski | 264/174.11 |
| 2006/0107601 | A1 * | 5/2006 | Inagaki et al. | 49/441 |
| 2006/0162256 | A1 * | 7/2006 | Tsuchida et al. | 49/479.1 |
| 2007/0077394 | A1 * | 4/2007 | Kubo et al. | 428/136 |
| 2007/0089371 | A1 * | 4/2007 | Krause | B60J 10/0011 49/441 |
| 2007/0296250 | A1 * | 12/2007 | Yatsuda et al. | 296/201 |
| 2009/0241430 | A1 * | 10/2009 | Knape | B60J 10/0031 49/489.1 |
| 2010/0102597 | A1 * | 4/2010 | Ellis | 296/201 |
| 2012/0151842 | A1 * | 6/2012 | Miura et al. | 49/458 |

OTHER PUBLICATIONS

EP 10800659.4 Supplementary European Search, mailed Oct. 14, 2015.

* cited by examiner

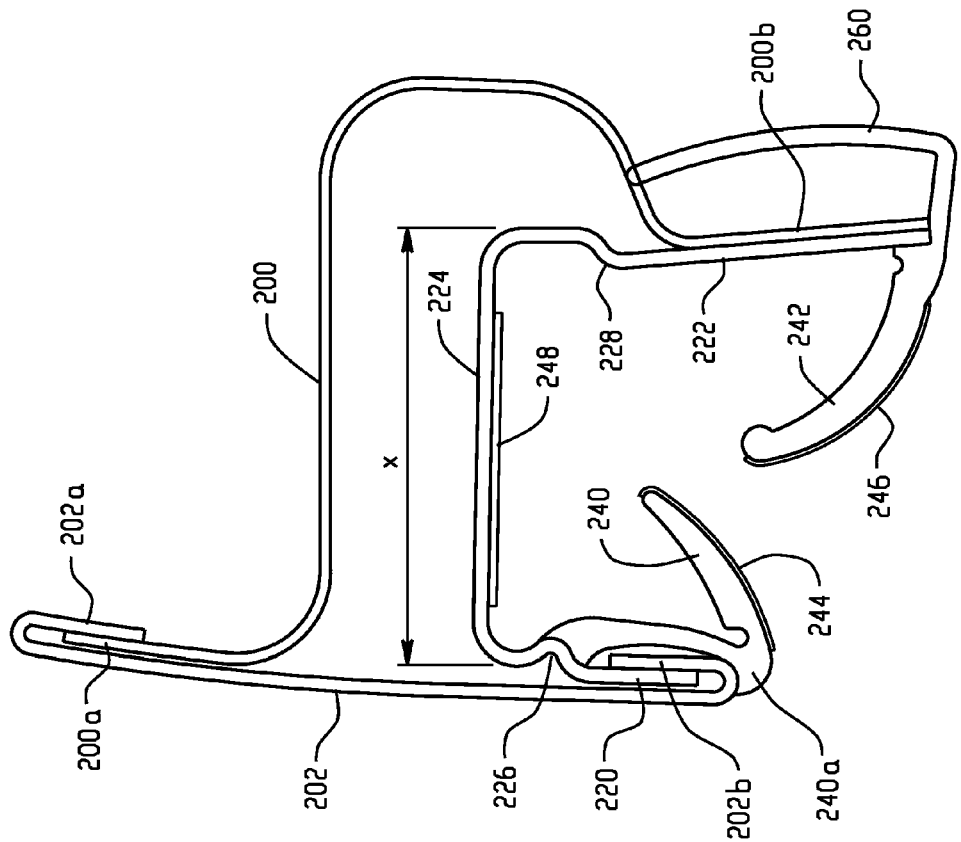
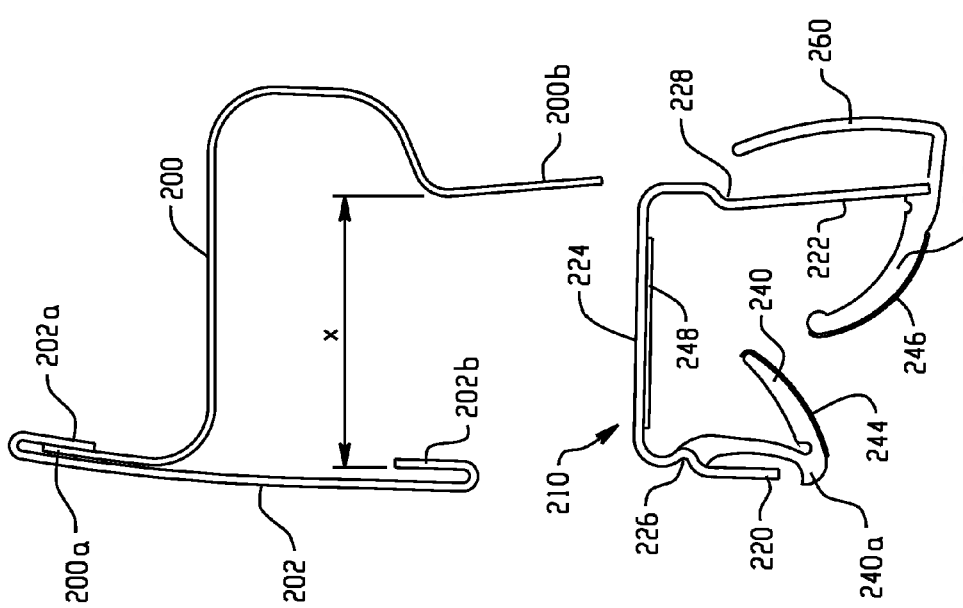

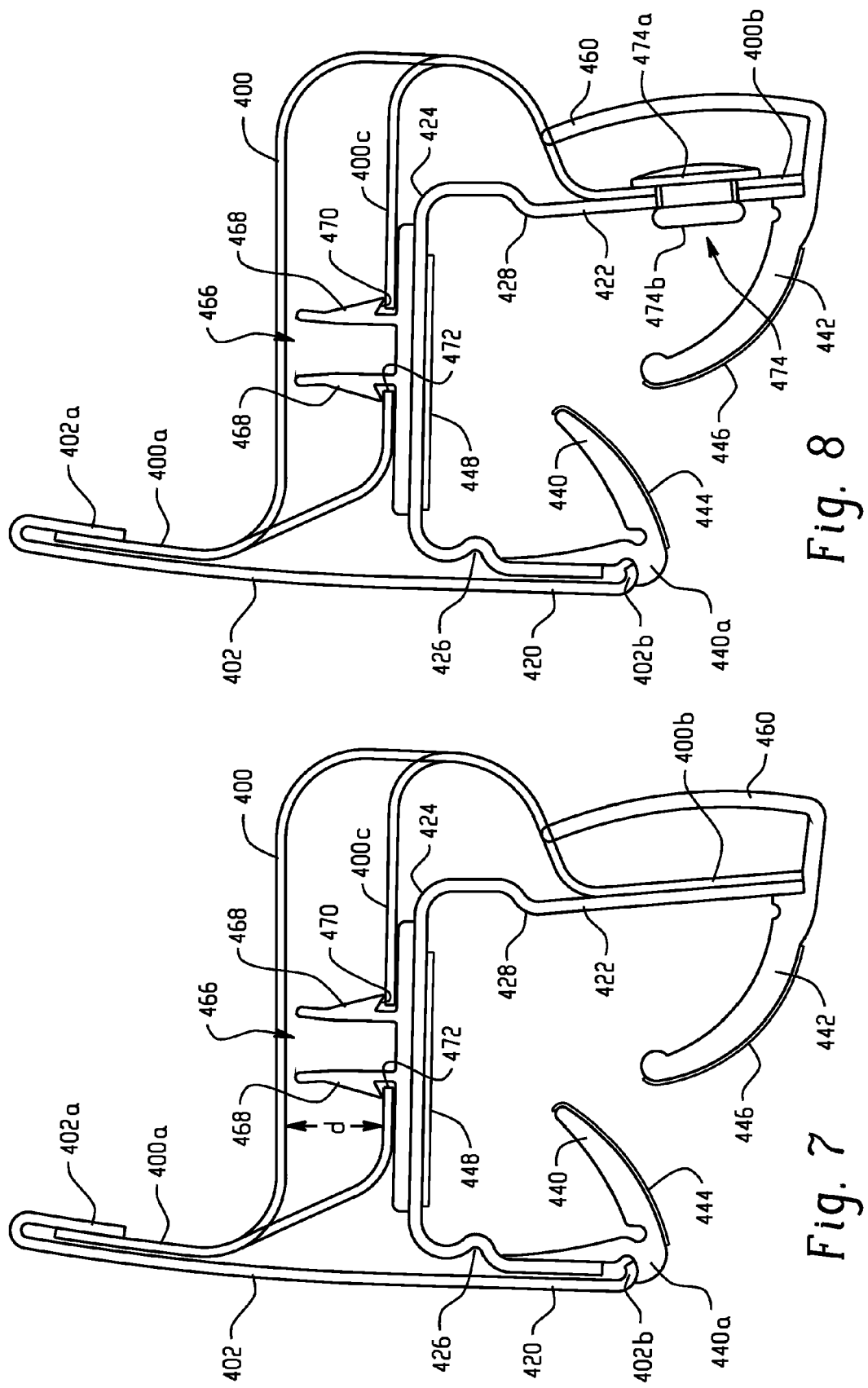

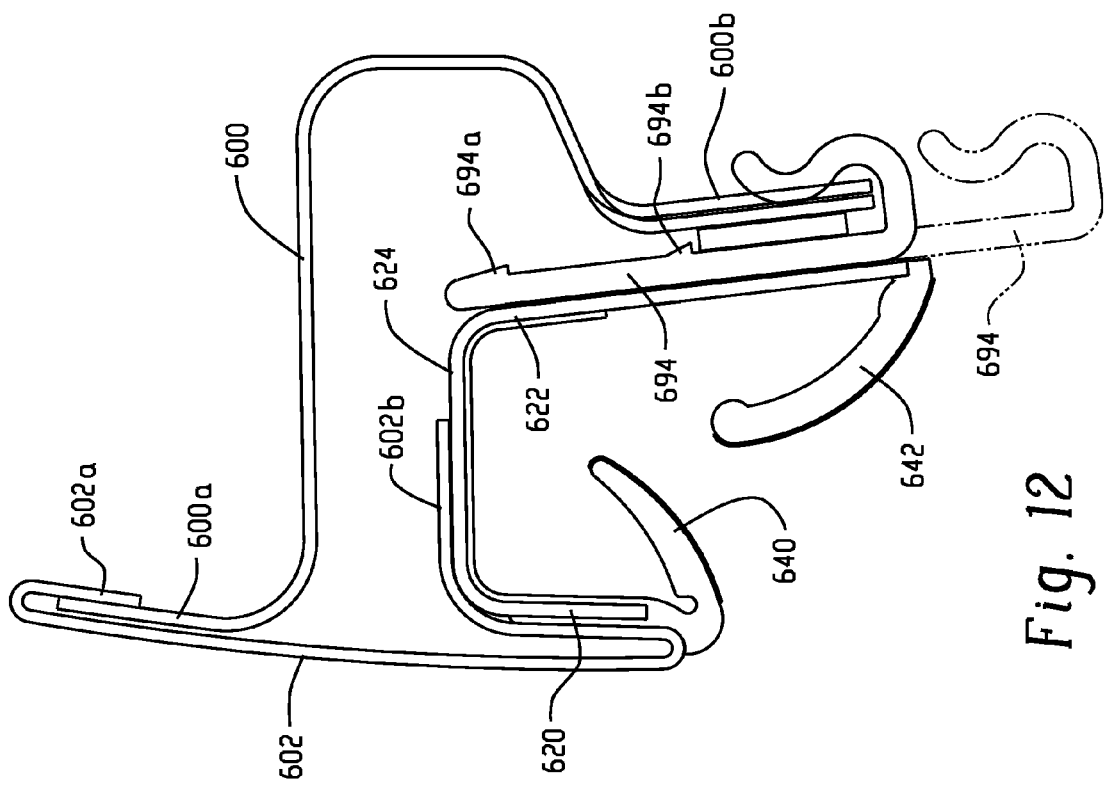
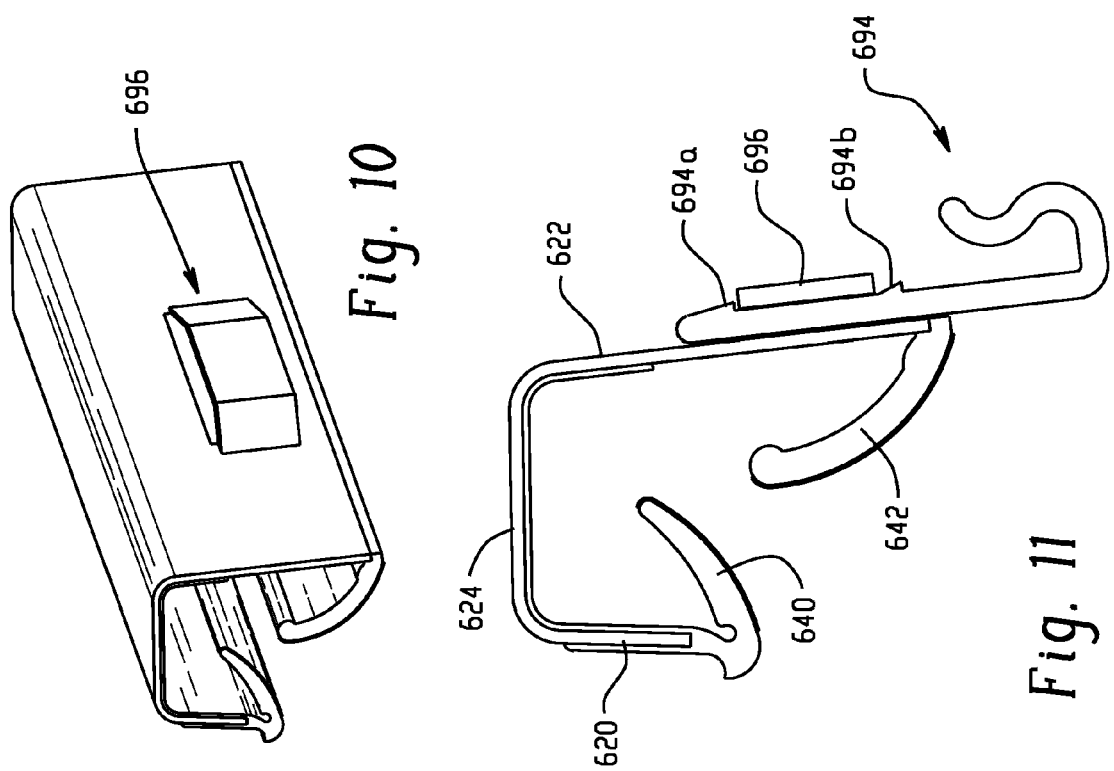

CO-EXTRUDED U-CHANNEL WITH INTEGRATED GLASSRUN

This application claims the benefit of PCT International Patent Application No. PCT/US2010/042414, filed on 19 Jul. 2010, and claims the benefit of U.S. Provisional Patent Application Ser. No. 61/226,548, filed on Jul. 17, 2009, the disclosures of which are incorporated herein by reference.

This application claims priority from U.S. provisional patent application Ser. No. 61/226,548, filed 17 Jul. 2009, the disclosure of which is expressly incorporated herein by reference.

BACKGROUND OF THE DISCLOSURE

This application relates to a weatherseal assembly, and more particularly to a seal assembly that improves upon a conventional glassrun. The disclosure finds particular use in association with a movable door window, although selected concepts may find application in related environments.

Automotive vehicles oftentimes use a glassrun to receive a peripheral edge of a movable window, for example along A and B-pillar portions of the window and extending into the header between the pillars. As is typical, a first or inner door panel is joined to a second or outer door panel along at least portions of perimeter edges of a vehicle window opening. The glassrun includes a generally U-shaped channel usually provided between terminal edges of the inner and outer door panels about the window opening. The generally U-shaped channel is dimensioned to receive a separately formed glassrun weatherseal, such as a generally U-shaped extruded rubber member that has a cavity formed by first and second leg portions interconnected by a base portion. Flexible seal lips extend inwardly from the first and second leg portions into the cavity and sealingly engage opposite surfaces of the window as it is raised and lowered relative to the vehicle door.

Such a prior art assembly is representatively illustrated in FIGS. 1 and 2. Particularly, first door portion or inner door panel 100 is joined to second door portion or outer door panel 102. Each door panel has an opening that together form a window opening 104 when the door panels are joined. The window opening is opened or closed by a movable window (not shown) that is selectively raised and lowered from an open position (where the window is disposed below a belt portion) to an upper, partially closed or fully closed position. Glassrun channel 106 has a generally U-shaped cross-section (FIG. 2) and includes, for example, an A-pillar portion 108, B-pillar portion 110, and interconnecting header 112 (FIG. 1). First and second legs 114, 116 of the channel are joined together by an interconnecting portion or base portion 118 (FIG. 2). The channel is secured to the inner and outer door panels in a conventional manner, for example, second leg 116 is received in a fold region or hem 120, while the first leg 114 is secured to the inner door panel along a mating surface by welding or the like.

The first and second legs of the channel preferably include inwardly extending detents 122, 124, respectively, that are used to retain a glassrun weatherseal 130. The glassrun weatherseal includes a first or A-pillar portion 132, a second or B-pillar portion 134, and an interconnecting header portion 136 dimensioned for receipt within the cavity defined by the channel 106. Typically, the glassrun weatheresal has a generally U-shaped conformation and cross-section (FIG. 2) defined by a first leg 140, a second leg 142, and an interconnecting or base portion 144. Outwardly extending retaining members 146, 148 of the weatherseal cooperate with retention detents 122, 124, respectively, of the channel to hold the glassrun weatherseal in place.

In addition, seal lips 150, 152, 154 extend inwardly into the cavity defined by the legs and base of the channel. The seal lips selectively engage opposite surfaces of the window to provide an effective seal between the interior of the vehicle and the external environment. An additional trim lip 156 may be provided and integrally formed with the glassrun weatherseal for receipt over the interface between the inner door panel 100 and first leg 114 of the channel. In this manner, the trim lip provides an aesthetically pleasing finish along the interior of the vehicle.

This multi-piece glassrun sealing system (channel and weatherseal) has been commercially successful and widely used in the automotive industry. The assembly is typically mounted on a vehicle above the belt line around the daylight opening area of the vehicle door. However, a need exists for improved function and value to be provided in a structure that provides a more efficient structure that reduces material waste and minimizes the size of the glassrun channel, reduces production time, and decreases assembly time.

SUMMARY OF THE DISCLOSURE

A glassrun or weatherseal assembly includes a generally rigid channel having first and second legs joined by an interconnecting leg. First and second seal portions extend into a portion of the channel cavity and are adapted to seal against an associated vehicle window. A door frame assembly includes a first or inner door panel and second or outer door panel having end portions spaced apart by a dimension adapted to receive the channel. A mechanism or means for securing the channel to the door frame assembly is provided.

In one embodiment, the securing mechanism or means includes an adhesive/chemical bond between the door panel and the channel.

In another preferred embodiment, the securing mechanism or means includes an adhesive tape for attaching the channel to the door panel.

In another preferred arrangement, the securing mechanism or means includes a rivet for attaching the channel to the door frame assembly.

In yet another arrangement, the securing mechanism or means includes a snap-fit fastener for attaching the channel to the door frame assembly.

A high value glassrun weathersealing concept integrates a door channel with a glassrun channel.

The co-extruded channel is used above the belt in a vehicle door in place of a separate glassrun channel and glassrun weatherseal.

The seal section may be formed from a variety of materials including rubber, plastic, or any variant thereof.

The seal section may use flock, low friction coating, blended materials to provide a low-friction interference, or no coating at all depending on the material of the seal.

The channel may be metal, plastic, or other suitable rigid material.

A primary benefit of the present disclosure is the ability to provide a one-piece channel and seal arrangement that replaces a multi-piece system previously used, and preferably used above the belt line.

Another advantage relates to the reduction in material waste associated with minimizing the size of the glassrun channel.

Still another benefit is associated with the reduced production time of the component, as well as the decreased assembly time.

Still other advantages are associated with the ability to use an in-line sweep process to conform the weatherseal assembly to a final shape or conformation, as well as improved location of the weatherseal in the channel.

Still other features and benefits of this disclosure will become more apparent from reading and understanding the following detailed description.

BRIEF DESCRIPTION OF THE DRAWINGS

FIG. 4 is an exploded view of the assembled door portions and the separately formed glassrun of the present disclosure.

FIG. 5 shows the glassrun or weatherseal assembly mounted to the door.

FIG. 6-23 illustrate preferred arrangements of securing a weatherseal assembly to the vehicle door.

DETAILED DESCRIPTION OF THE PREFERRED EMBODIMENTS

Figure 1:
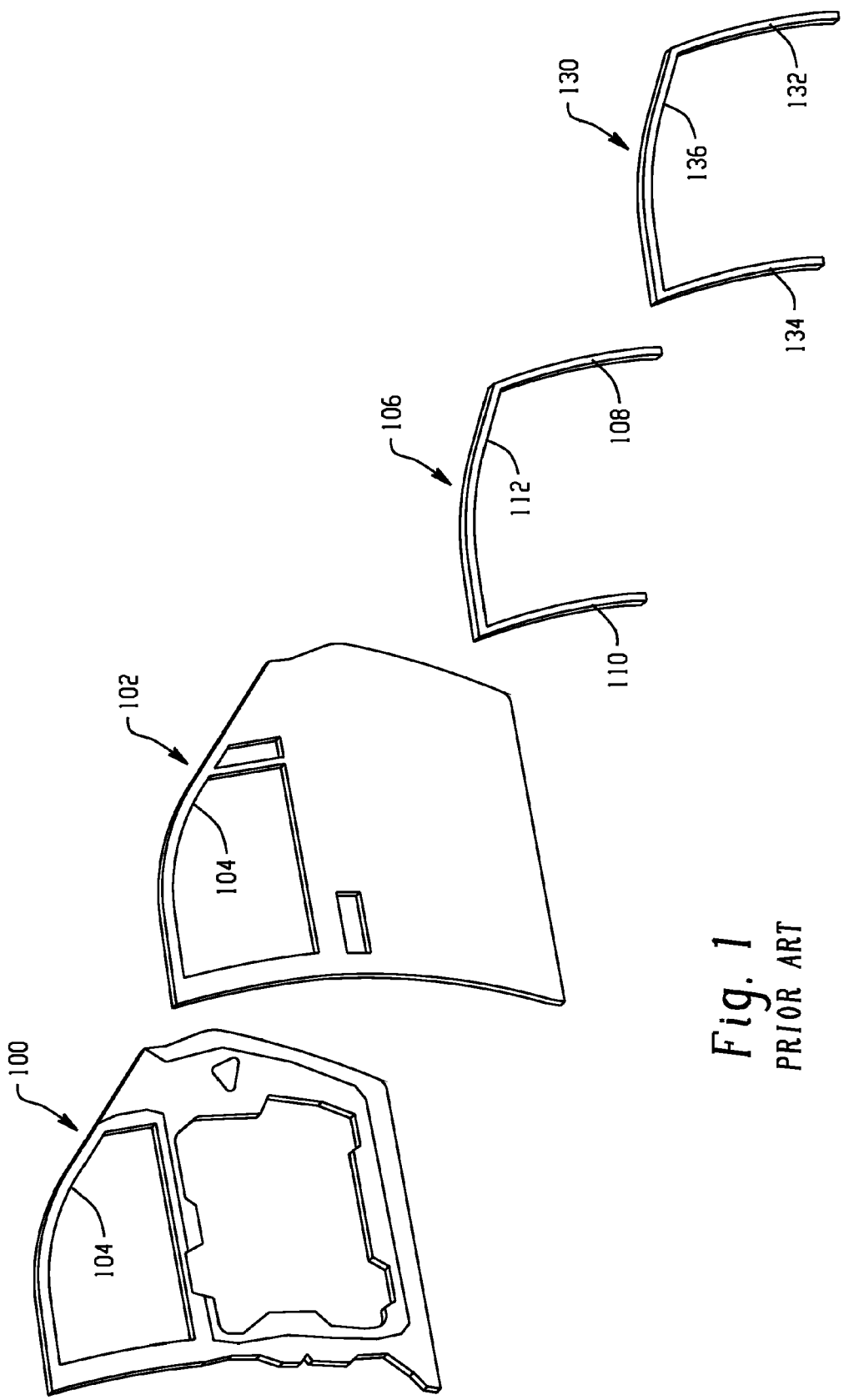
FIG. 1 is an exploded representation of a prior art arrangement of a glasssrun system for a vehicle door.
Figure 2:
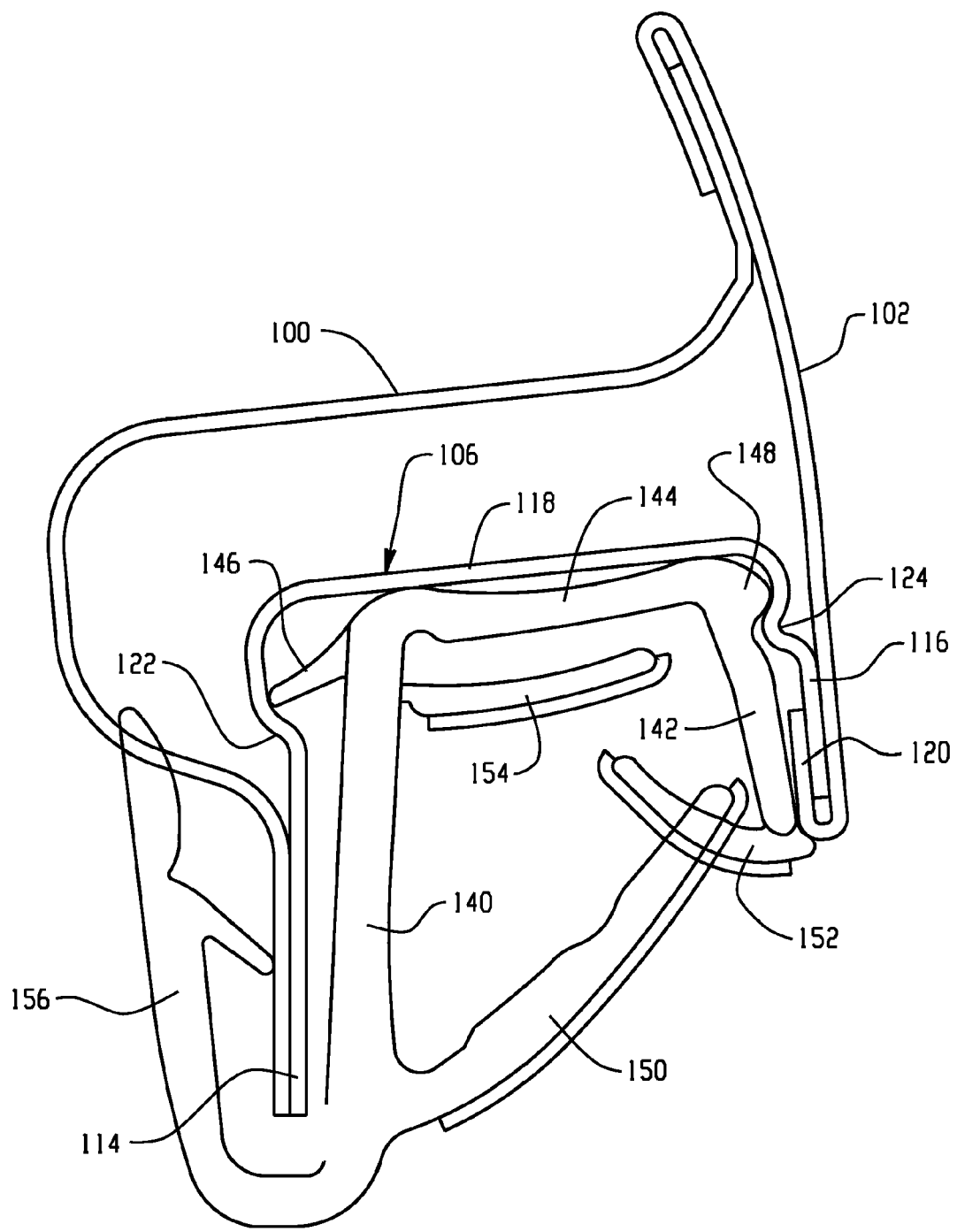
FIG. 2 is a cross-sectional view through an assembled glassrun of the type shown in FIG. 1.

Where possible, and for purposes of brevity and ease of understanding, the following embodiments of the present disclosure attempt to use a similar numbering scheme, in which each embodiment is incremented by reference numerals increased by a factor of one hundred (100).

Figure 3:
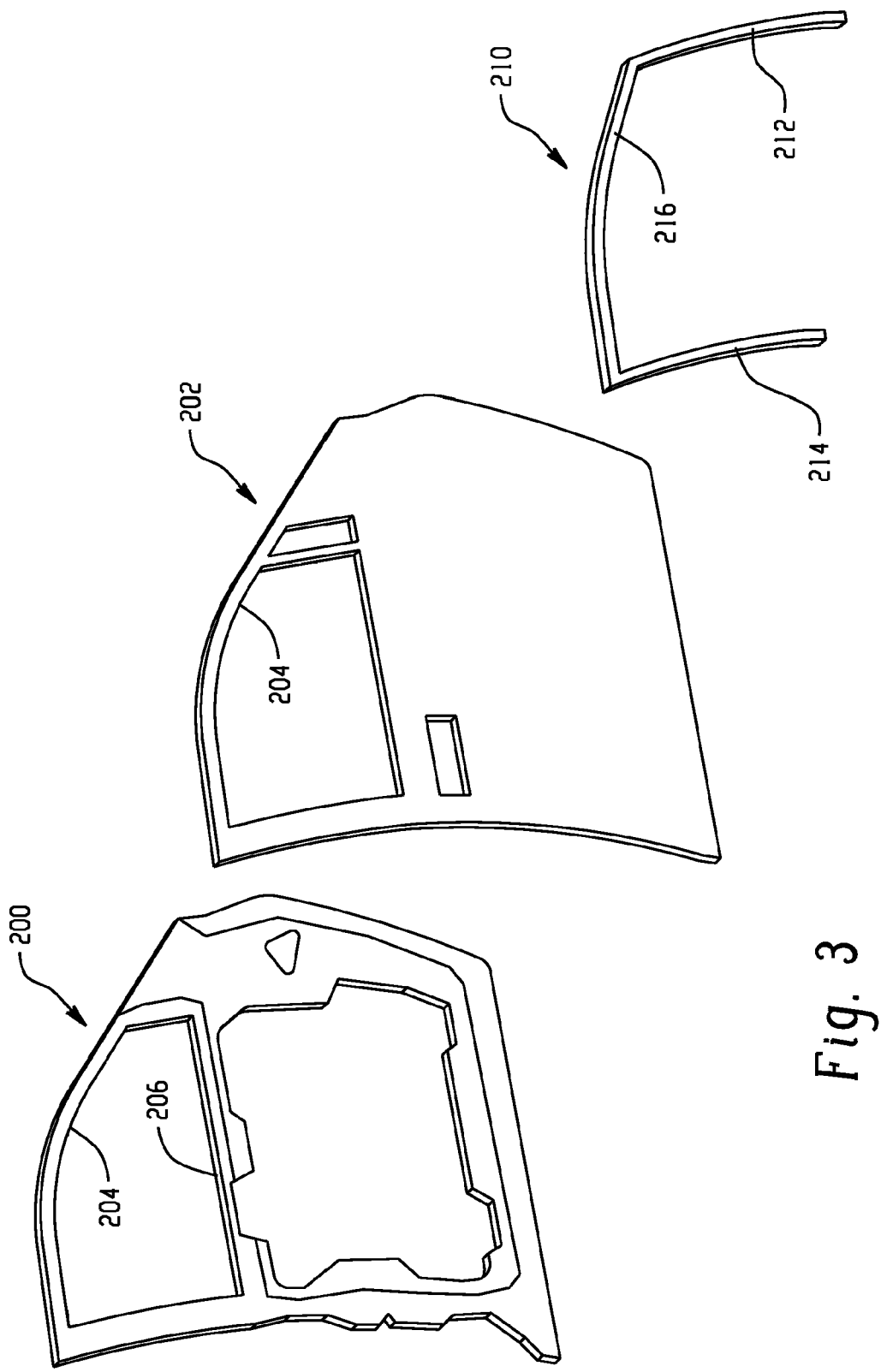
FIG. 3 is an exploded perspective view of the door and glassrun assembly of the present disclosure.

Turning first to the embodiment of FIGS. 3-5, a vehicle door and glassrun or weatherseal assembly of the present disclosure are shown in disassembled relation (FIGS. 3 and 4). The vehicle door preferably includes a first door portion or inner door panel 200 and a second door portion or outer door panel 202. Each door panel preferably includes an opening therethrough so that when joined together, a window opening 204 is provided above the belt line 206 of the vehicle door. As is well known in the art, the door is preferably a metal or plastic structure that is stamped or molded to a desired configuration and the first and second door panels have overlapping regions of each door panel that are secured together in a well known manner. It will be appreciated by one skilled in the art that the conformations of the inner and outer door panels may vary from the few arrangements shown in the various embodiments, however, the first and second door panels generally have terminal edge portions that are spaced apart by a predetermined dimension X that receives the channel, which in turn is dimensioned to receive the peripheral edge of a movable window therein. More particularly, the integrated weatherseal assembly 210 is shown as an above belt glassrun that includes a first or A-pillar portion 212, a second or B-pillar portion 214, and an interconnecting third or header portion 216. Of course, it will be understood that this discussion is equally applicable to a rear door, or even a tailgate with a movable window. So, for example, in FIGS. 4 and 5, the outer door panel includes fold regions or hems 202a, 202b. The first fold region 202a receives a terminal edge 200a of the inner door panel 200. Fold region 202b, on the other hand, is adapted to receive a portion of the first leg of the integrated weatherseal to be described further below. Likewise, region 200b of the inner door panel is conformed for operative engagement with the channel, again in a variety of manners with one of various securing mechanisms or means to be described below.

The channel 210 retains the general U-shape conformation, as formed by first leg 220, second leg 222, and an interconnecting or base portion 224. In addition, indented or retaining portions 226, 228 are preferably provided for subsequent repair or replacement, e.g., for retention of a separately formed glassrun seal structure of the type identified by reference numeral 130 in FIG. 1. However, the channel 210 in accordance with the present disclosure includes integrated seal portions that are preferably co-formed with the channel. For example, seal lips 240 and 242 are preferably co-extruded and extend from regions of the first and second legs 220, 222, respectively. In addition, each seal lip is preferably a flexible material such as a plastic, elastomer/rubber, composite that may or may not include an abrasion resistant coating 244, 246 shown on each seal lip. In addition, an abrasion resistant layer 248 is preferably provided along an interior surface of the base portion 224. These surfaces 244, 246, 248 provide a low-friction, abrasion resistant, durable material that provides improved performance and durability.

Moreover, trim lip 260 preferably extends from the second leg 222. In this illustrated embodiment of FIGS. 4 and 5, the trim lip is shown as a continuation of the material that forms the second lip 242, although this need not be the case. In other words, it will be understood that the trim lip 260 can be formed from the same or a different material as the seal lips, or separately attached to the channel if desired.

One skilled in the art will recognize that a preferred material of construction for the channel is metal, such as a roll form steel, or any other rigid material that can be suitably shaped and be compatible with the door panel. For instance, steel, aluminum, other metals, or a rigid plastic, or a combination can be used without departing from the scope and intent of the present disclosure. The seal sections may be made of a rubber, plastic, or any variation thereof. The abrasion resistant coatings on the other hand could instead be a flock, a low-friction coating, a blended material that provides a low-friction interference, or in some instance there may be no coating at all since the underlying material of the seal lip structure serves this dual purpose. Moreover, although the integrated channel and seal arrangement shown in FIG. 4 could be formed in sequential stages (or possibly by methods other than extrusion), the present disclosure preferably manufactures the integrated glassrun by co-extruding the components.

As further illustrated in FIG. 5, the seal lip 240 preferably extends from connection with the first leg 220 in a region adjacent the retaining indent 226. Although that mounting location may be varied, one advantage is that the terminal end of the first leg 220 be adapted for receipt within the fold region 202b of the outer door panel. The seal lip is formed so that hinge region 240a may abut against the outer surface of the fold region 202b of the channel. The fold region interlocks the channel within the dimension X provided by the inner and outer door panels, and the trim lip 260 is dimensioned to overlie and substantially cover the interface between interconnecting region 200b of the inner door panel and the second leg 222.

Figure 6:
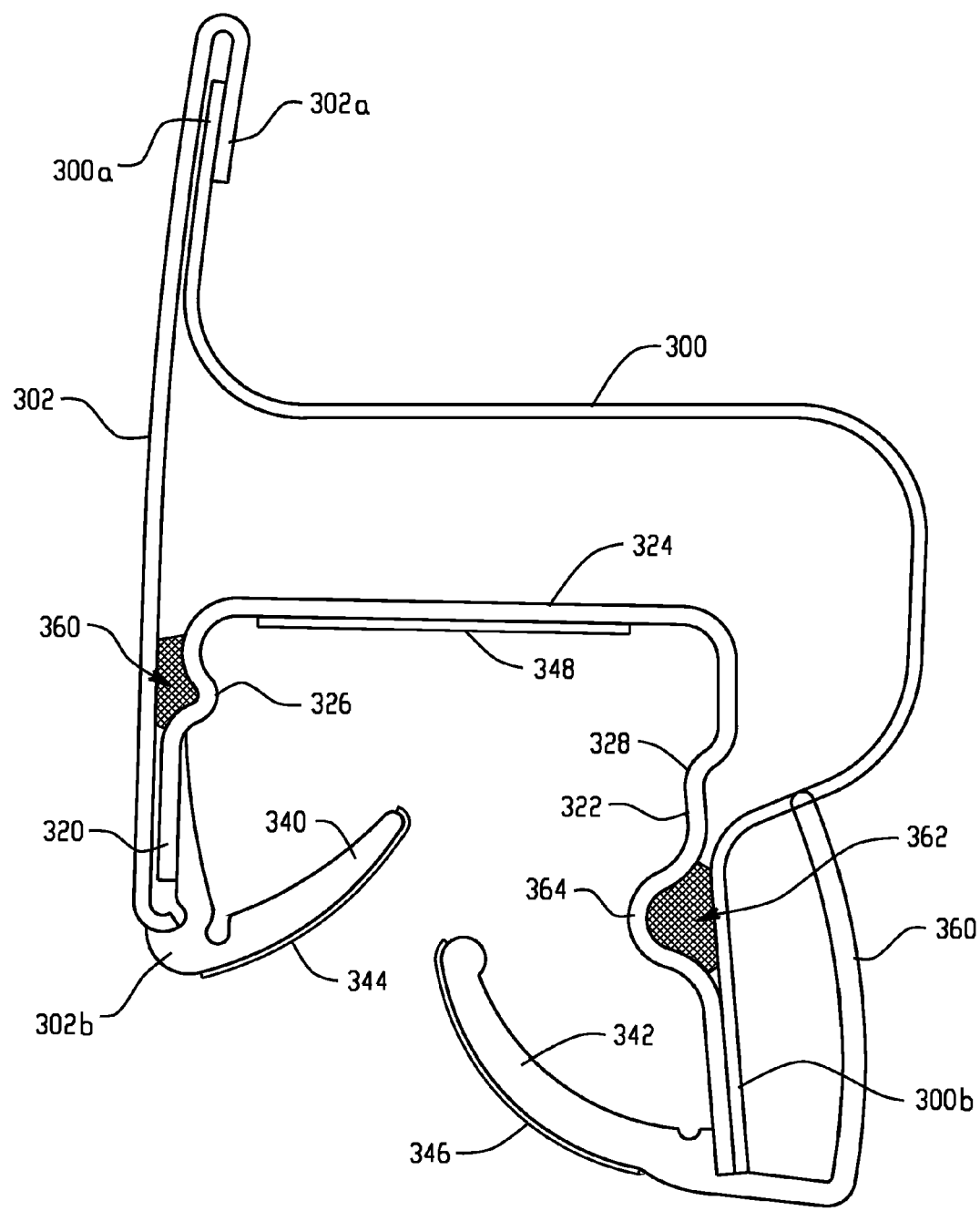

Still other ways of interconnecting the integrated glassrun channel with the door panel portions are shown in FIG. 6. The shape or configuration of the inner and outer door panels are substantially identical to that shown in FIGS. 4 and 5 but the integrated channel has some slight differences. The fold region 302a is maintained, while opposite end 302b eliminates the fold region. In this embodiment, the integrated glassrun channel is secured along the first leg 320 by an adhesive/chemical bond 360. Preferably, the bonding region 360 is advantageously located adjacent the retention detent 326 and thus is interposed between the external surface of the first leg 320 and the internal surface of the outer door panel 302. Once secured, the first leg of the integrated glassrun channel and the outer door panel are secured together. Likewise, an adhesive/chemical bond 362 is provided to secure the second leg 322 to portion 300b of the inner door panel. The detent 328 is not deemed to be the best site for the bond so that an additional detent 364 is provided in the second leg to accommodate the adhesive/chemical bond that is interposed between the second leg and the internal surface of the inner door panel. Again, once the adhesive/chemical bond has cured, the integrated glassrun channel is secured to the door. It will also be appreciated that the seal lip 340 may be extruded and bonded along a substantially greater portion of the first leg 320b, as illustrated in FIG. 6. However, the remainder of the structure is substantially similar to the structure shown and described in FIGS. 4-5.

The exemplary embodiment of FIG. 7 shows a slightly modified conformation of the inner door panel 400. Specifically, a local depression 400c is spaced a dimension d (FIG. 7) from the rest of the inner door panel to accommodate a fastener such as snap-fit fastener 466. The snap-fit fastener 466 includes outwardly tapering regions or arms 468 that terminate in undercut shoulders 470 spaced from the terminal end of the tapering regions so that once the tapering regions are pushed through opening 472 in the inner door panel portion 400c, the arms snap outwardly and the undercut shoulders 470 prevent inadvertent removal of the integrated channel from the door panel structure. Again, for ease of reference, the remainder of the structure of the integrated channel is substantially identical to previously described embodiments and identified by reference numerals in the four hundred (400) series for ease of illustration and understanding.

As will be appreciated, the snap-fit fastener can be coextruded with the remainder of the integrated channel, preferably along the base portion 424 on a surface opposite that of the abrasion resistant surface 448. The dimension d is sufficient to accommodate the height of the snap-fit fastener, and the abutment engagement between outer door panel portion 402b with the hinge region of the 440a of the first seal lip, as well as the abutting engagement between inner door panel portion 400b with the second seal lip or trim seal 460, provides for accurate alignment of the channel within the door panel.

Features of the embodiment of FIG. 7 are carried over into the arrangement of FIG. 8 with the addition of an interconnection between the second leg 422 and inner door panel portion 400b. Specifically, the additional interconnection between the channel and the door is assured by providing rivets 474 at spaced locations along the length of the integrated glassrun. Enlarged head 474a abuts the inner door panel portion and is hidden from view within the interior of the vehicle by the trim lip 460. Likewise, the deformed or peened end 474b of the rivet is located beneath the seal lip 442 so that the seal lip prevents inadvertent contact between the surface of the window and the rivet during advancement and retraction of the movable window into the integrated channel.

Figure 9:
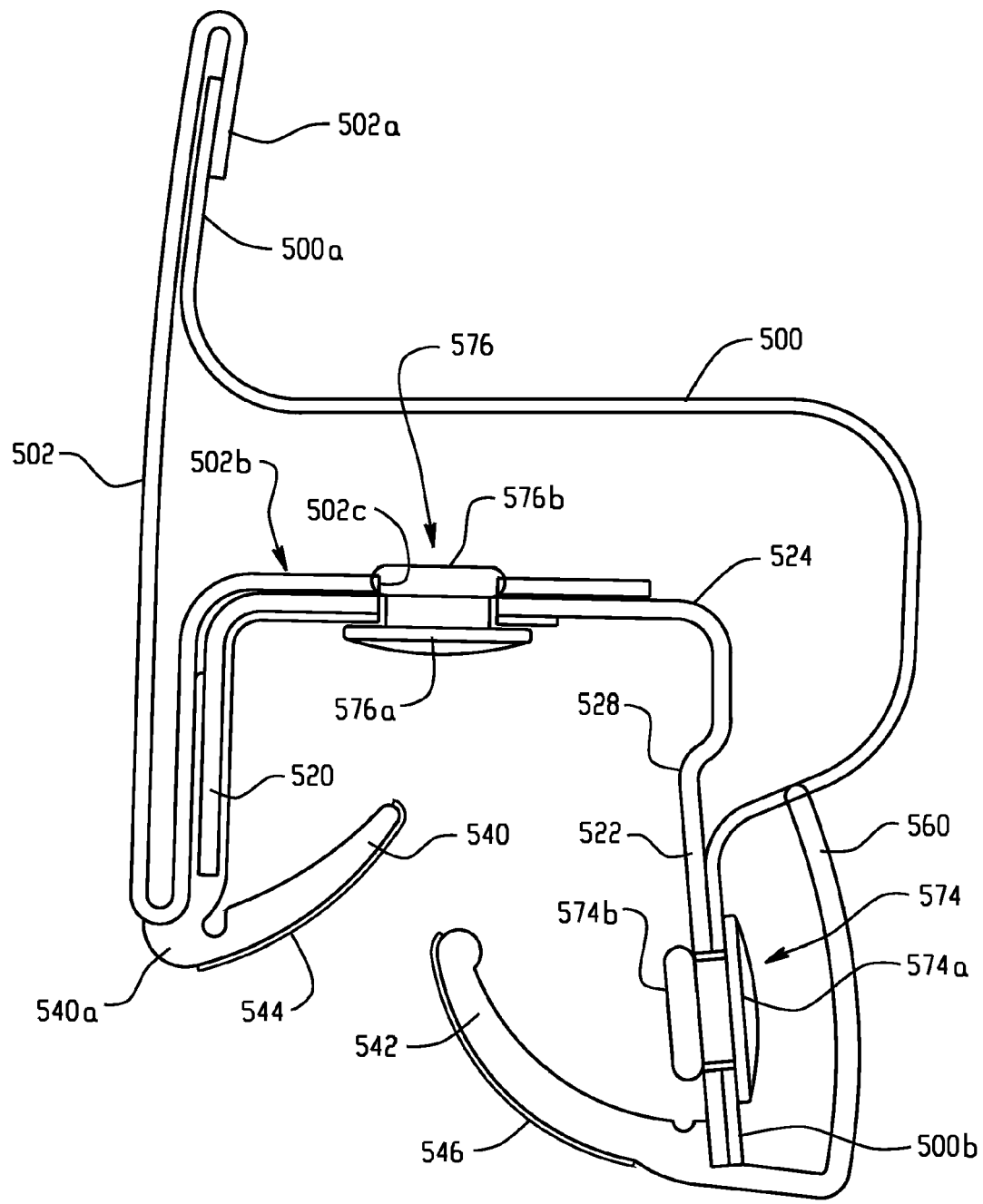

The embodiment of FIG. 9 provides for a dual rivet attachment and also includes an additional modification to the outer door panel. Particularly, tabs 502b extend generally perpendicular to the main portion of the outer door panel 502. Openings 502c in the tabs receive a first set of rivets for securing a base portion 524 of the channel to the outer door panel along the tabs 502b. The series of rivets 574 are substantially the same as those described relative to FIG. 8 and secure the second leg 522 to the inner door panel. In much the same way, the second series of rivets 576 each include a head portion 576a that is enlarged relative to the opening 502c and the opposite end is deformed as represented by 576b to secure the base portion of the integrated channel to the outer door panel.

FIGS. 10-12 illustrate another manner of securing the integrated channel to the door. More particular details of this attachment arrangement are provided in commonly owned co-pending International Application No. PCT/US2009/050261, filed Jul. 10, 2009, the entire disclosure of which is incorporated herein by reference. The attachment arrangement includes a generally J-shaped fastener portion 694 in which an elongated first leg includes a detent connection member. In this preferred embodiment, the detent connection member includes first and second engaging portions or shoulders 694a, 694b that are spaced apart along the leg in the direction of insertion. The first shoulder 694a is closer to a terminal end of the leg and cooperates with an opening or spanning portion 696 formed along second leg 622 in a first position of the fastener 694 as shown in FIG. 11. The rounded terminal end of the leg 694 facilitates initial insertion of the leg into the opening 696 so that the fastener is integrated into the channel (and thus attached to the channel when shipped from the manufacturer).

When the integrated channel is installed on the door, base 624 abuts against outer door panel portion 602b and leg 620 is aligned adjacent the outer door panel 602. The leg 694 is then further advanced through the opening in spanning portion 696 so that the second shoulder 694b passes through the opening and the undercut of the shoulder 694b holds the leg 694 in a mounted, second position (FIG. 12). As shown in FIG. 12, the J-shaped end of the leg is received over portion 600b of the inner door panel in the second position and thus retains the integrated channel in place. The detent shoulder 694b prevents inadvertent removal whereby the integrated channel securely grips the inner door portion 600b and is properly positioned via the abutting engagement along outer door portion 602, 602b.

Figure 13:
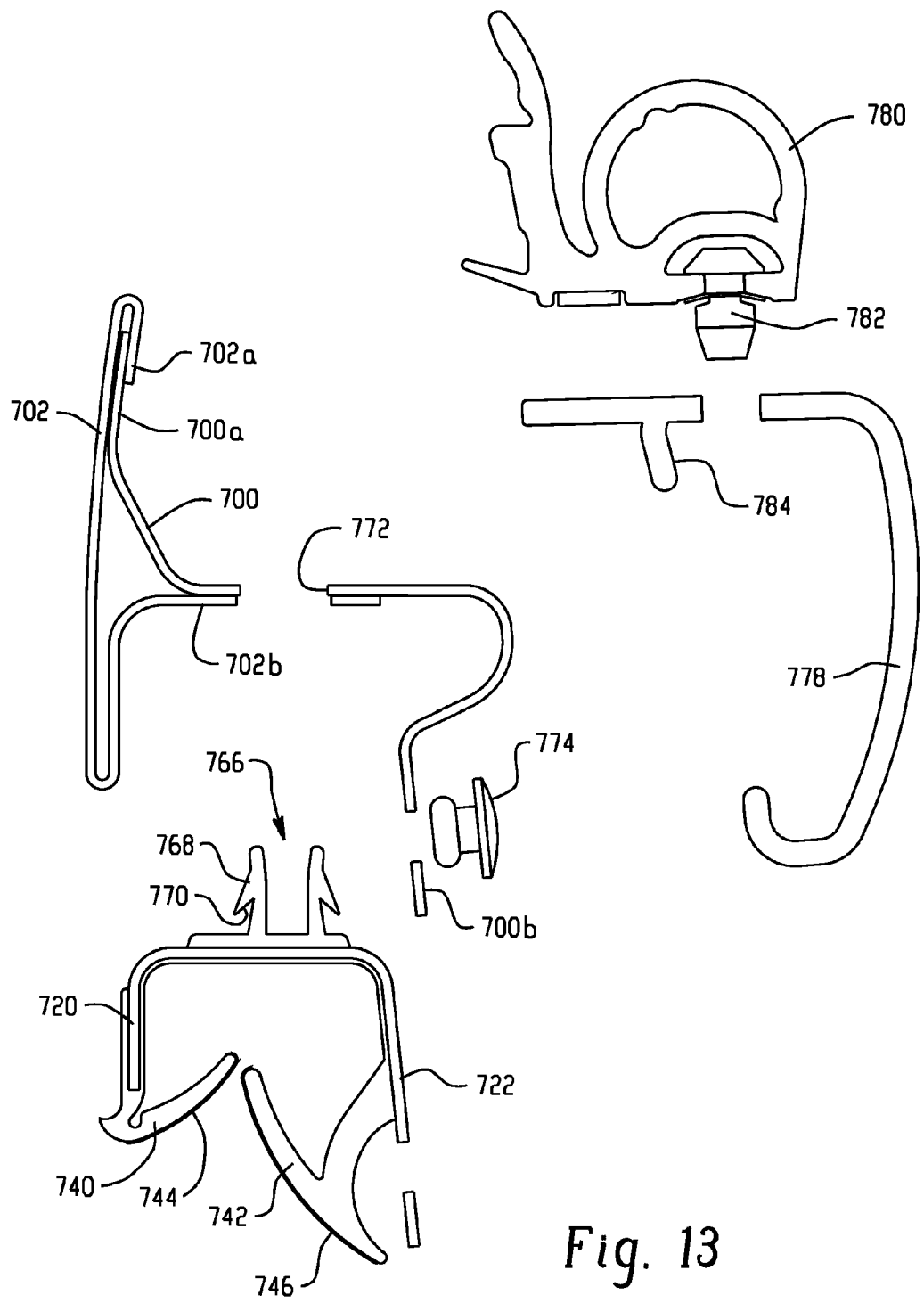
Figure 14:
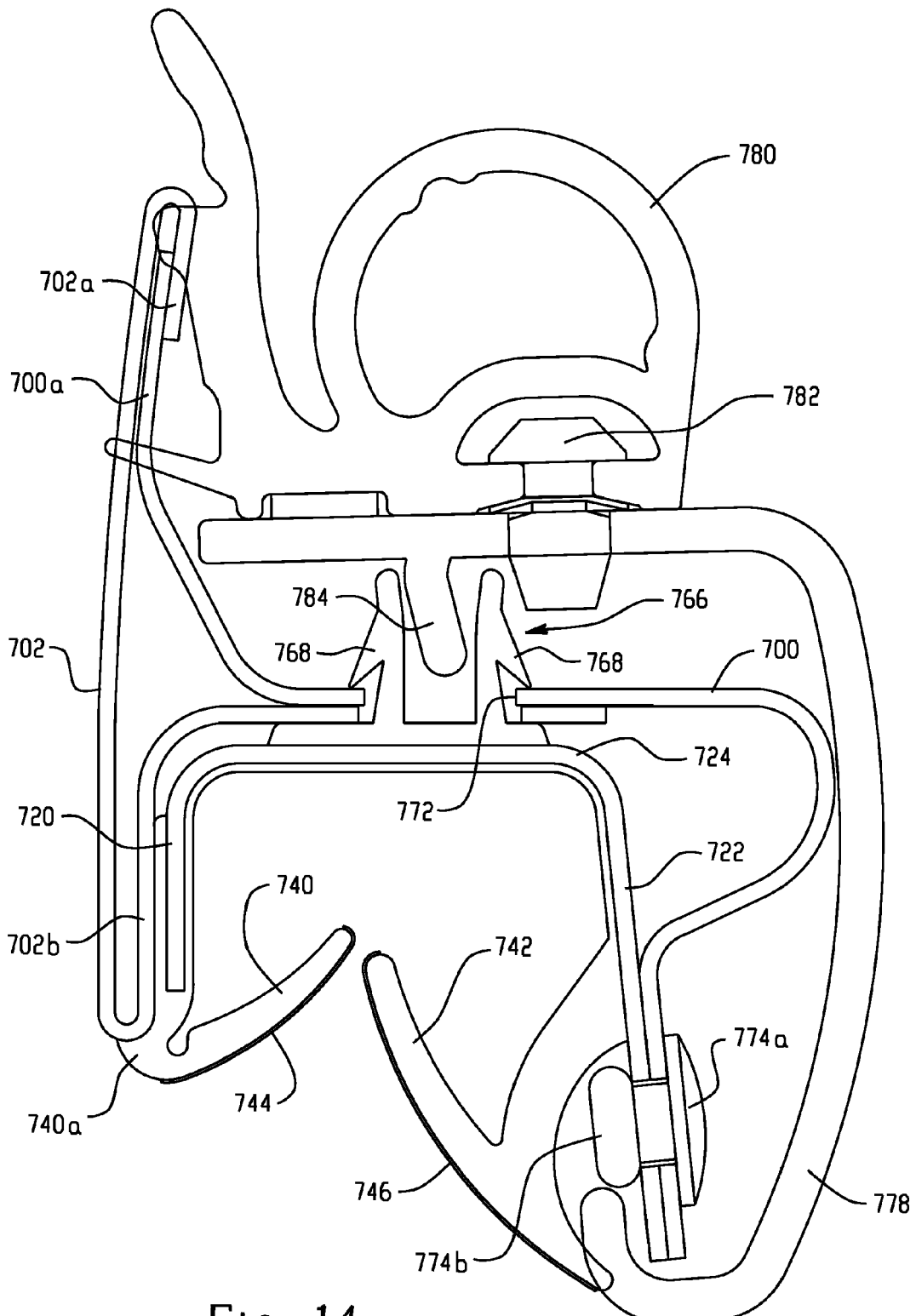

FIGS. 13 and 14 employ a similar combination of the snap-fit fastener and the rivet of the embodiment of FIG. 8 to secure the integrated channel to the door. Specifically, the snap-fit fastener 766 is preferably formed by coextruding the snap-fit fastener onto the base portion 724 of the channel, and the fastener extends through aligned openings 772 in the abutting portions of the inner and outer door panels. Seal lip 742 is slightly modified and is secured to second leg 722 at a region spaced inwardly from the outer terminal end of the channel. This arrangement accommodates receipt of rivet 774, and particularly the deformed end 774b beneath the seal lip, while the enlarged head 774a is received beneath an enlarged garnish portion 778. The details of the structure of the garnish portion are generally well-known in the art so that description herein merely references use of a seal 780 secured by fastener 782 to the garnish member 778. The garnish is, in turn, secured to the snap-fit fastener via leg 784. It will also be appreciated that major portions of the channel are coated in material that at least partially encapsulates the rigid channel.

Figure 15:
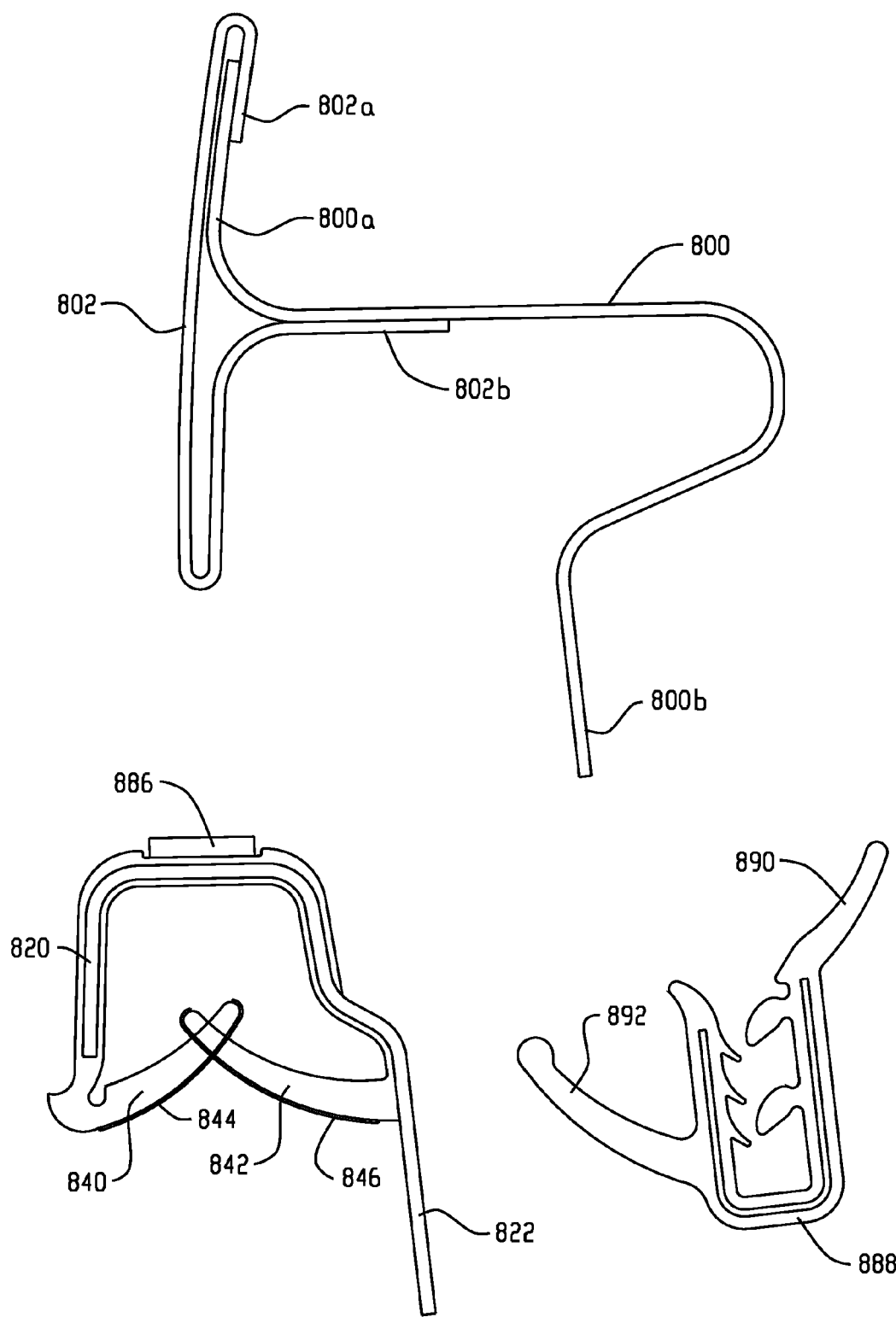
Figure 16:
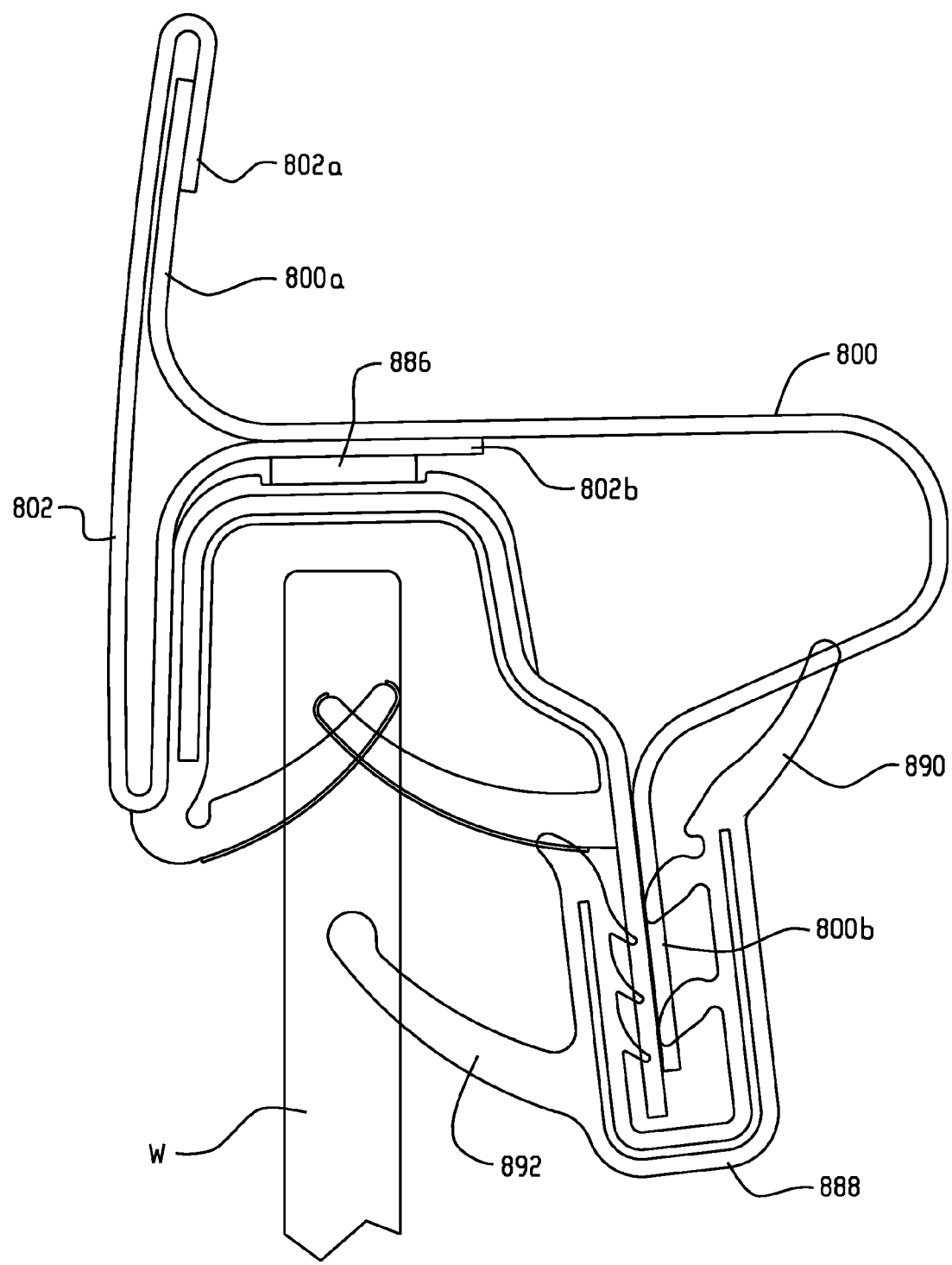

FIGS. 15 and 16 illustrate an inner and outer door panel assembly that is similar to that shown in FIGS. 13 and 14, but does not use an opening through the door panel portions to secure the integrated weatherseal. Rather, an adhesive tape 886 is provided along the base portion of the integrated channel and, as illustrated, is disposed on the outer surface of the base portion for engagement with the surface 802b of the outer door panel. In addition, the second leg of the integrated channel is disposed in abutting planar engagement with the portion 800b of the inner door panel. Received over the mating portions is a generally U-shaped body 888 (that may include a rigid core therein) having a trim seal portion 890 that extends over a portion of the inner door panel. Additionally, flexible seal 892 is coextruded with the body and adapted for sealing engagement with a surface of the window W.

Figure 17:
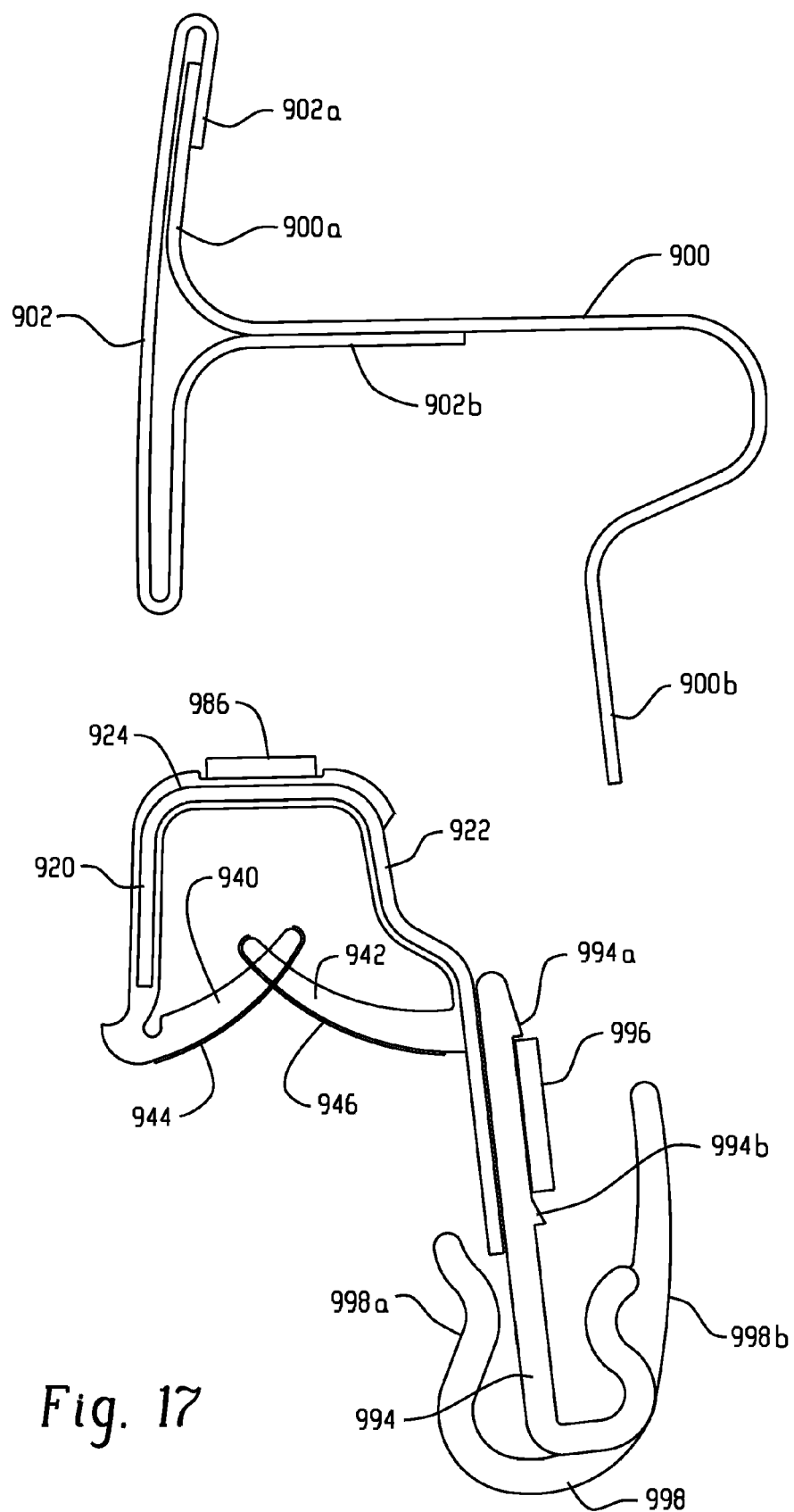
Figure 18:
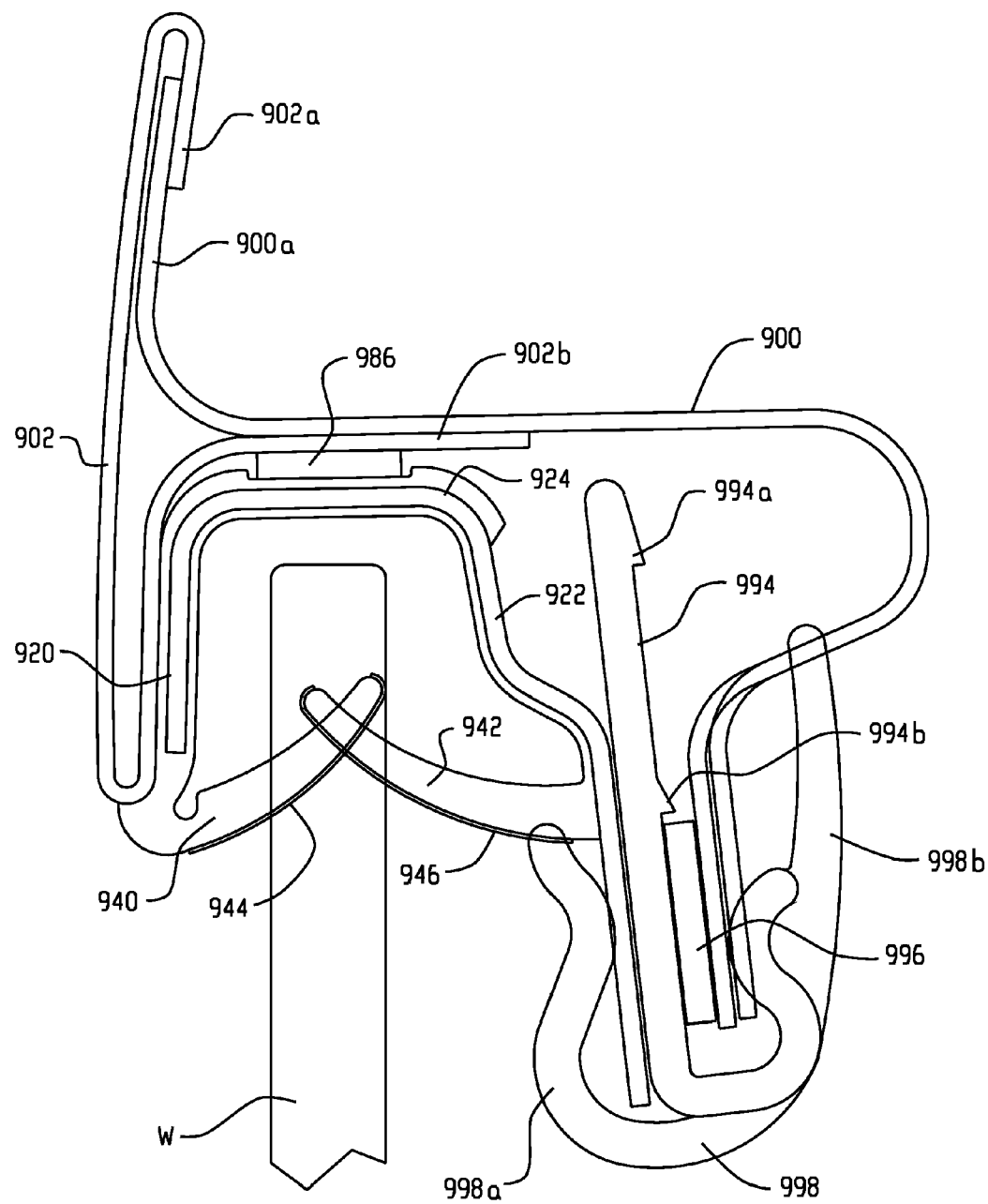

Still another embodiment is represented in FIGS. 17 and 18. As similarly disclosed in commonly-owned co-pending application Ser. No. 61/080,135 (attached as Exhibit A), a clip or fastener 994 is received in a slot associated with the second leg of the channel. The slidable clip has a first shoulder 994a that prevents inadvertent removal of the clip from the slot (FIG. 17). In addition, a second shoulder 994b is subsequently advanced through the slot 996 (FIG. 18) to lock the second leg into clamping engagement with the inner door panel. This second position of the clip as shown in FIG. 18 also effectively positions the trim member in covering relation, and in conjunction with the seal tape provides for an accurate positioning of the integrated channel in the door portions. Further, a cover lip 998 has a first portion 998a that covers the extension of the second leg of the channel, and a second portion 998b that acts as a trim lip. The base portion of the channel is secured to the outer door panel via an adhesive tape 986 that engages the outer door panel along region 902b.

Figure 20:
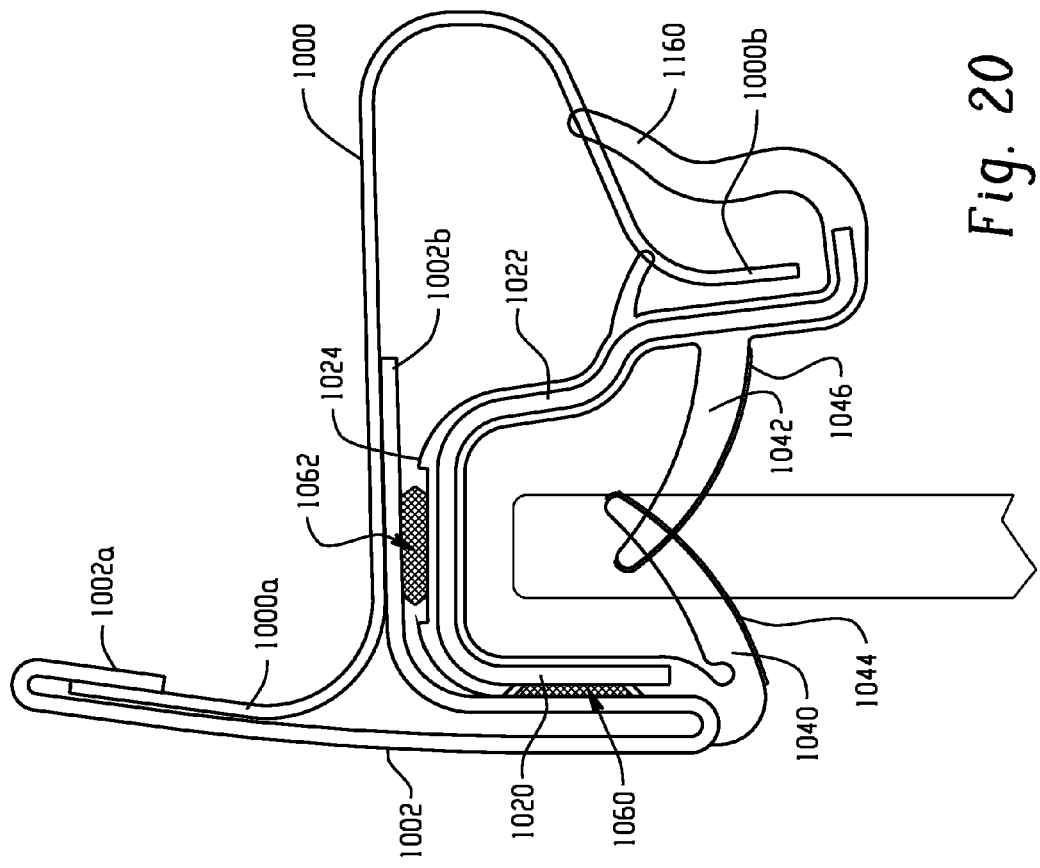
Figure 19:
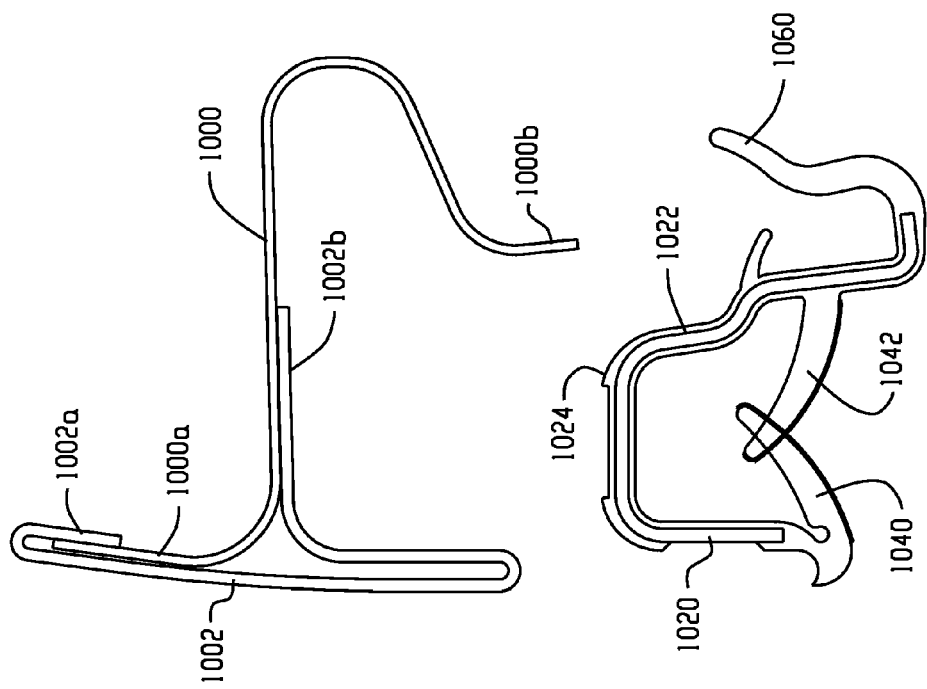

FIGS. 19 and 20 are a variation of the embodiment of FIG. 6. In this arrangement, the adhesive/chemical bond regions are located at different positions on the integrated channel. For example, the first adhesive/chemical bond region 1060 is disposed between the first leg 1020 of the channel and the reverse mounted portion 1002b of the outer door panel. Similarly, the second adhesive/chemical bond 1062 is interposed between the base portion 1024 of the channel and the terminal end of the outer door panel portion 1002b. It will also be appreciated that the rigid core may include extruded portions over selected surfaces that may enhance the bonding with the adhesive/chemical bond 1060 or 1062, or may form pocket regions that aid in containing the adhesive/chemical bond.

Figure 22:
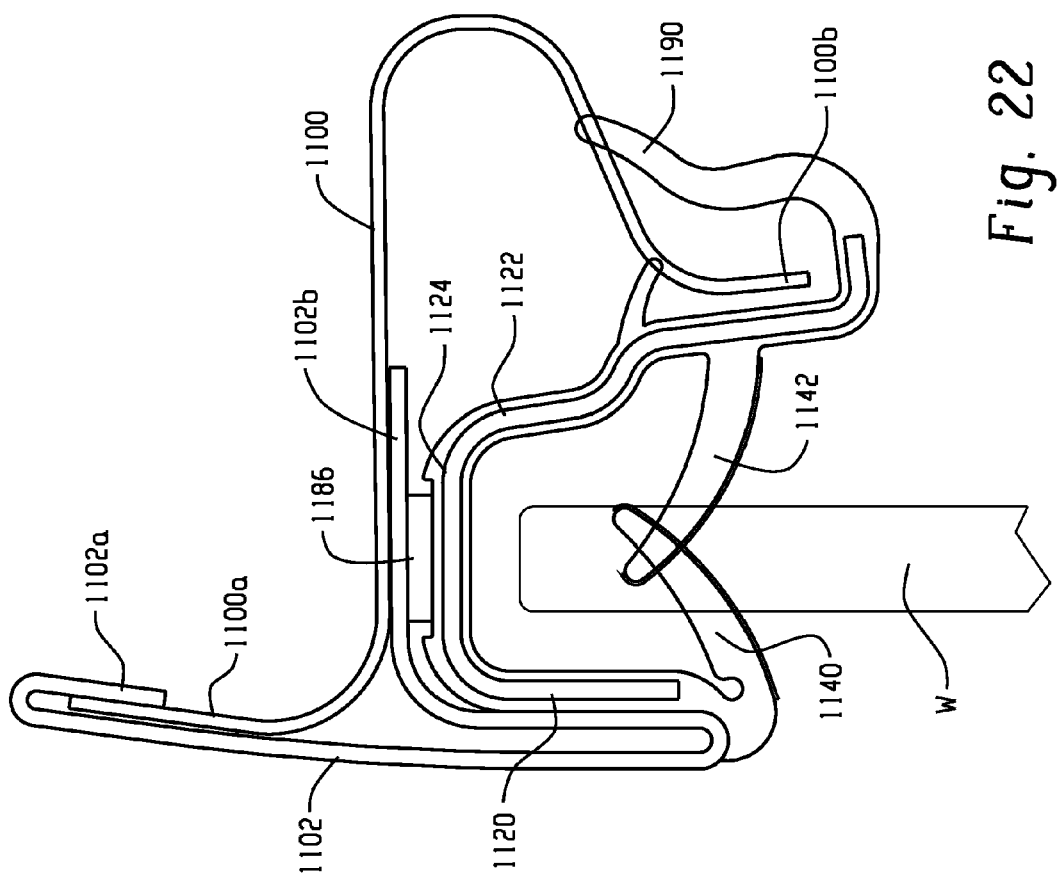
Figure 21:
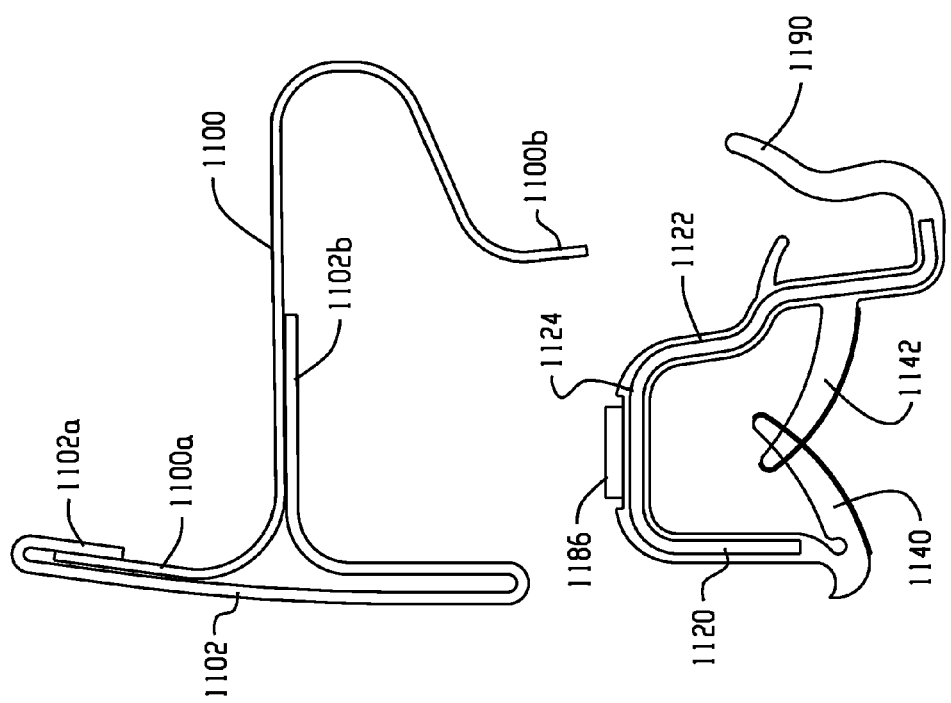

The embodiment of FIGS. 21 and 22 is a simplified version of the embodiment of FIGS. 15 and 16. That is, only an adhesive tape 1186 is used to secure the integrated channel in place, preferably along the base portion 1124 of the channel. Once again, the rigid core portion of the channel may include external surfaces coextruded in a different material to enhance the securing of the channel to the door panel.

Figure 23:
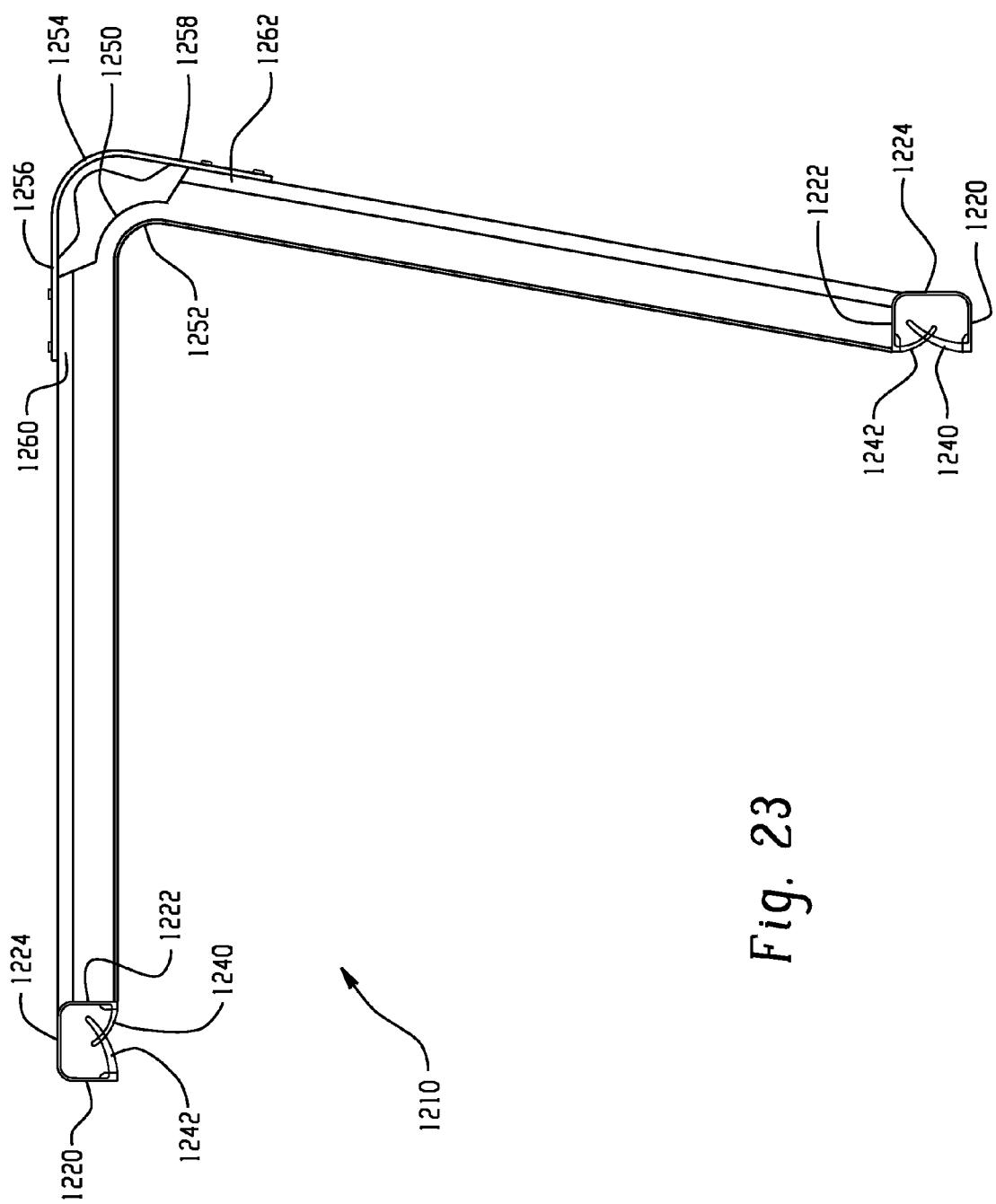

FIG. 23 shows a modified rigid channel 1210 formed from a rigid material such as metal (e.g., steel or aluminum), rigid plastic, composite, etc. The channel is bent to provide a continuous pillar and header portion, for example, that retains the general U-shape conformation, as formed by first leg 1220, second leg 1222, and an interconnecting or base portion 1224. In addition, seal lips 1240 and are preferably co-extruded and extend from regions of the first and second legs 1220, 1222, respectively, joined together by a base portion 1224 in a manner as described above in connection with one of the many embodiments. Each seal lip is preferably a flexible material such as a plastic, elastomer/rubber, composite that may or may not include an abrasion resistant coating on each seal lip 1240, 1242 and/or an abrasion resistant layer is preferably provided along an interior surface of the base portion 1224. Oftentimes, the glassrun is radiused or bent along its length and, in particular, is bent along a tighter radius such as the transition between a pillar and header portion of the assembly. In the past, in tightly radiused regions the weatherseal portions are typically removed and replaced by a molded seal lip assembly that transitions between the pillar and header. The expense of a molded intermediate assembly in sharp corner regions or along tight radii for aesthetics and operational reasons unfortunately adds to the overall cost of the weatherseal assembly.

As illustrated in FIG. 23, a portion 1250 of the rigid channel is notched or removed, particularly in the tight radius region or sharp corner 1252 between the pillar and header portions of the assembly. The channel can undergo a tight corner or curve and a reinforcement member 1254 is provided to provide the necessary stiffness and rigidity. That is, the notched region allows the assembly to be bent through a tight radius and the reinforcement member then retains this bent configuration. The reinforcement member may be formed from a rigid material such as metal, plastic, composites, etc. and is preferably fastened at first and second ends 1256, 1258 to regions 1260, 1262 adjacent the notched portion 1250 to bridge or interconnect base portions of the assembly at opposite ends of the notched portion. In this manner, the sealing lips can be smoothly bent along the tight radius region 1252 without the use of a molded intermediate seal assembly.

The invention has been described with reference to the preferred embodiments. Modifications and alterations will occur to others upon reading and understanding this specification. It is intended to include all such modifications and alterations in so far as they come within the scope of the appended claims or the equivalents thereof.

Having thus described the invention, we claim:

1. A weatherseal assembly for a window opening comprising:

first and second legs joined by an interconnecting portion to form a generally U-shaped, rigid channel enclosing a window receiving cavity, the first and second legs and interconnecting portion each formed of one of a rigid metal, plastic, or combination thereof;

a first seal lip co-extruded on at least a portion of the first leg and a second seal lip co-extruded on at least a portion of the second leg without encapsulating an entirety of the channel such that the first and second seal lips are integrally secured to the respective first and second leqs, and the first and second seal lips extending at least partially toward the other of the first and second legs, respectively, of the channel and formed of a different material than the channel that extend into a portion of the cavity and are adapted to seal against an associated vehicle window;

a door frame assembly including an inner door panel and an outer door panel having end portions spaced apart by a first dimension to receive the rigid channel;

an interlocking mechanism between the rigid channel and the door frame assembly for securing the rigid channel to the door frame assembly; wherein the first and second legs of the channel each include a detent that extends into the cavity at a location between the interconnecting portion and an outer terminal end of the respective first and second legs; and wherein the interlocking mechanism is one of an adhesive or chemical bond located in the detent of at least one of the first and second legs of the channel.

2. The assembly of claim 1 wherein the rigid channel includes a notched portion formed along a radiused region of the assembly wherein the notched portion allows bending of the channel along a radius.

3. The assembly of claim 2 further comprising a reinforcement member interconnecting portions of the rigid channel on opposite sides of the notched portion.

4. The assembly of claim 3 wherein the reinforcement member includes opposite ends and the notched portion includes opposite ends, the opposite ends of the reinforcement member secured the rigid channel at regions along the opposite ends of the notched portion.

5. A weatherseal assembly for a window opening comprising:

a rigid, generally U-shaped metal channel having first and second legs joined by an interconnecting portion to form a window receiving cavity;

first and second seal portions coextruded to and integrated with only the first and second metal legs, respectively, of the metal channel and integrated with without encapsulating an entirety of the channel and formed of a different material than the channel that provide first and second lips that extend into a portion of the cavity and adapted to seal against an associated vehicle window;

a door frame assembly including an inner door panel and an outer door panel having end portions spaced apart by a first dimension to receive the rigid channel so that the first leg of the channel is disposed along the outer door panel and the second leg of the channel is disposed along the inner door panel of the door frame assembly, at least one of the first and second seal portions abuttingly engaging either the inner door panel or the outer door panel, respectively ; and a securing mechanism between the rigid channel and the door frame assembly for securing the rigid channel to the door frame assembly; wherein the first and second legs of the channel each include a detent that extends into the cavity at a location between the interconnecting portion and an outer terminal end of the respective first and second legs; and wherein the securing mechanism is one of an adhesive or chemical bond located in the detent of at least one of the first and second legs of the channel.

6. The assembly of claim 5 wherein the other of the first and second seal portions abuttingly engages the other of the inner door panel or the outer door panel.

* * * * *